United States Patent [19]

van Eck

[11] Patent Number: 5,294,091

[45] Date of Patent: Mar. 15, 1994

[54] STOP COCK FOR A LIQUID CONTAINER

[75] Inventor: Alfred van Eck, Oosterhout, Netherlands

[73] Assignee: Keystone International Holdings Corp., Houston, Tex.

[21] Appl. No.: 844,641

[22] PCT Filed: Sep. 21, 1990

[86] PCT No.: PCT/US90/05407

§ 371 Date: Apr. 1, 1992

§ 102(e) Date: Apr. 1, 1992

[87] PCT Pub. No.: WO91/05707

PCT Pub. Date: May 2, 1991

[30] Foreign Application Priority Data

Oct. 6, 1989 [NL] Netherlands ............ 8902488

[51] Int. Cl.5 .............................. F16K 35/00
[52] U.S. Cl. ........................ 251/95; 251/105; 251/107; 251/173; 251/306
[58] Field of Search ............... 137/315; 251/95, 104, 251/105, 106, 107, 170, 173, 174, 208, 305, 306

[56] References Cited

U.S. PATENT DOCUMENTS

| 1,206,320 | 11/1916 | Gittler. | |
|---|---|---|---|
| 2,820,676 | 7/1954 | Cleaves. | |
| 2,965,354 | 12/1960 | Grove et al. | |
| 2,987,072 | 6/1961 | Muller. | |
| 3,148,553 | 9/1964 | Carr. | |
| 3,341,170 | 9/1967 | Housworth. | |
| 3,349,639 | 10/1967 | Magoon. | |
| 3,355,141 | 11/1967 | Cooper. | |
| 3,474,818 | 10/1969 | Hartman. | |
| 3,537,473 | 11/1970 | DeZurik, Jr. | 137/556.6 |
| 3,642,248 | 2/1972 | Benware | 251/172 |
| 4,266,752 | 5/1981 | Johnson | 251/173 |
| 4,273,152 | 6/1981 | Freeman | 137/315 |
| 4,344,632 | 8/1982 | Green et al. | 251/173 |
| 4,399,833 | 8/1983 | Holtgraver | 137/315 |
| 4,747,427 | 5/1988 | Smith et al. | 251/288 |
| 4,815,693 | 3/1989 | James et al. | 251/14 |
| 4,826,133 | 5/1989 | Hiltebrand | 251/306 |

FOREIGN PATENT DOCUMENTS

| 0145634 | 6/1985 | European Pat. Off. . |
| 0215723 | 3/1987 | European Pat. Off. . |
| 1228878 | 11/1966 | Fed. Rep. of Germany . |
| 625586 | 8/1927 | France . |
| 0173673 | 10/1982 | Japan . |
| 2100828 | 8/1971 | Netherlands . |
| 7504702 | 3/1975 | Netherlands . |
| 391408 | 2/1961 | Switzerland . |
| 1006377 | 9/1965 | United Kingdom . |

Primary Examiner—A. Michael Chambers
Attorney, Agent, or Firm—Browning, Bushman, Anderson & Brookhart

[57] ABSTRACT

A stop cock for a liquid container, comprising a substantially annular valve housing, a circular valve rotatably mounted in the valve housing, a handle mounted on an operational shaft for rotating the valve between a closed and open position, a seat mounted in the valve housing and cooperating with the valve in the closed position, characterized in that the handle (21) comprises a recess (28) for rotatably receiving a stop bush (29) that comprises a cam (30) which in the closed position cooperates with an indentation (42) of a top plate (24) arranged on a boss (9) and includes a circular passage for the shaft (7), said stop bush (29) having an unround passage (33) for mounting a correspondingly formed driving shaft (34) of an unlocking lever (35), the handle (21) and the top plate (24) in a plurality of positions.

18 Claims, 3 Drawing Sheets

STOP COCK FOR A LIQUID CONTAINER

BACKGROUND OF THE INVENTION

1. Field of the Invention

The invention relates to a stop cock for a liquid container, comprising a substantially annular valve housing provided on either side of its longitudinal center line with bosses in which passages have been arranged for rotatably supporting a substantially circular valve perpendicularly to the longitudinal center line of the valve housing, a handle mounted on an operational shaft applied outside the valve housing for rotating the valve between a closed position and an open position which is perpendicular thereto, and a seat mounted in the valve housing and cooperating with the valve in the closed position of the stop cock.

2. Description of the Background

Known stop cocks of this type, e.g. when they are applied on tank lorries, are mounted between two flange pieces and this results in an extra heavy weight and a long construction length that is not always available or desired. If the seat of known stop cocks has worn out, it usually takes a lot of energy and time to dismount the worn out seat and almost always it will have to be replaced by an entirely new part. Many of the known stop cocks also have the disadvantage that in order to open the stop cock a lot of strength has to be exerted or that a long handle has to be used, respectively, and often they also tend to close of their own accord or to start "rattling".

SUMMARY OF THE INVENTION

The invention aims to improve the foregoing and furthermore to achieve some other advantages over the known stop cocks. According to the invention, this has been achieved in that the handle comprises a recess for rotatably receiving a stop bush that comprises a cam that for the determination of the closed position can cooperate with an indentation of a top plate that is arranged on the boss situated on the operational side, and that comprises a circular passage for the operational shaft, said stop bush having an unround passage for a correspondingly formed driving shaft of an unlocking lever, and in that at least the handle and the top plate can be mounted in a plurality of positions.

The cam of the stop bush is preferably brassed by a spiral spring towards the periphery of the top plate, so one does not have to rely on the influence of gravity to have the cam of the stop bush end up in the recess in the closed position of the stop cock. For that matter, gravity could only do the job properly if the handle were mounted "on top".

The top plate that can be mounted in a plurality of positions may also comprise a cam along its periphery for restricting the open position, from which the stop cock can be rapidly closed in case of danger, and a cam for restricting a position in which the rear side of the valve can be cleaned.

The driving shaft of the unlocking lever can be inserted into the unround passage of the stop bush from either side.

The handle and the top plate may each comprise a security hole through which a padlock or seal can be inserted in the closed position of the stop cock. This is to comply with the often prevailing regulation that there has to be a double safeguard: in order to open a properly safeguarded stop cock, one requires both an unlocking lever and the key to the lock.

If the top plate is mounted by means of four bolts arranged in a rectangle onto four flange lugs of the boss situated on the operational side, then the top plate can be mounted in four different positions (rotated over 180, and upside down) and there would also be enough space for placing a padlock or seal.

If the central area of the edge of the valve that engages the seat extends spherically along a radius which is slightly bigger with respect to the rotational center line of the valve than the tangent circle on an unbiased seat about the same rotational center line, and if the valve is moreover rotably supported by a short shaft and a operational shaft in the extension thereof, so that the valve in the closed position may show a cavity directed towards the liquid container, and if the seat is furthermore received in a seat groove that is defined by the valve housing and an outlet piece that can be mounted in two different positions, it is guaranteed that the stop cock can be closed by exerting little force, and that the seat can easily be replaced.

The seat e.g. comprises a plastic ring, growing outwardly wider in cross-section in the radial direction, and having along its periphery a semi-circular groove in which a rubber O-ring is disposed, in which case the seat groove defined by the valve housing and the outlet piece comprises bevels adapted thereto. The semi-circular groove may transfer in the radial, inward direction into a deformation cavity.

The outlet piece may comprise a tap that, dependent on the position in which the outlet piece has been mounted, can be used as a vent cock or test cock.

The valve housing is mounted by means of four bolts arranged in a quadrangle to a preferably conically widening adapter that is welded onto the outlet stub of the liquid container.

In order to safeguard that the liquid container and the outlet stub connected thereto can be emptied to the greatest possible extent, it is furthermore determined by the invention that it is favorable to place the longitudinal center line of the valve housing at a downward angle of about 6° with respect to the longitudinal center line of the adapter. The valve housing and the outlet piece can be devised as conically narrowing.

BRIEF DESCRIPTION OF THE DRAWINGS

The invention will be further elucidated hereinafter on the basis of the drawing, showing by means of an example an embodiment of a stop cock according to the invention. In the drawing.

DESCRIPTION OF THE PREFERRED EMBODIMENT

Figure 1:
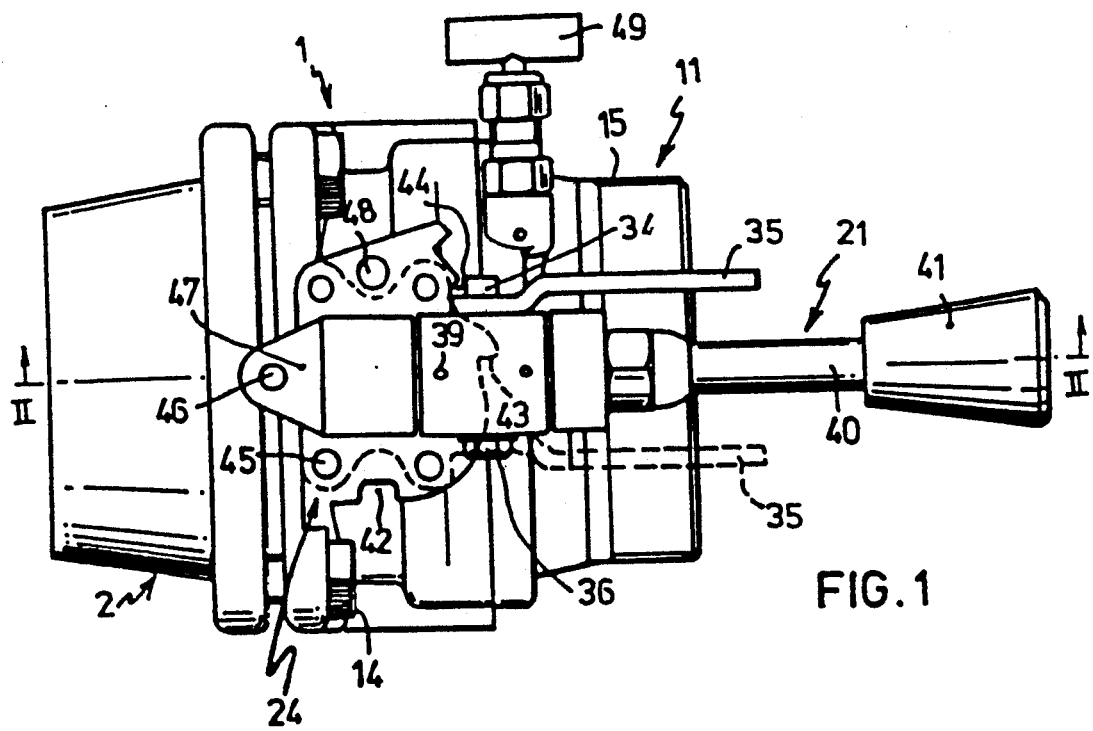
FIG. 1 shows a top view of the stop cock.

The stop cock shown in the drawing comprises a substantially annular valve housing 1 that is connected in a suitable manner to a horizontally extending adapter 2 that can be welded onto a stub (not shown) of a liquid container. The adapter 2 is shown as conically widening in the direction of the flow, so that it can be cut off at the correct diameter before welding it onto a stub. The inner diameter of most stubs ranges between approx. 78 and 84 mm.

In the annular valve housing 1, a circular valve 3 is mounted that is devised as concave at its upstream end, so that it actually is a disc-shaped valve.

At its bottom, the valve 3 comprises a bush 4 in which a short shaft 6 has been inserted, screwed into a lower boss 5 of the valve housing 1, so as to form the lower bearing of the valve 3.

At its top, the valve 3 comprises a bore for the bottom end of an operational shaft 7 that, by means of a pin 8, is connect fixedly to the valve 3 and that extends upwards through a bush 10 arranged in an upper boss 9 of the valve housing I so as to form the upper bearing of the valve 3.

The valve housing 1 and an outlet piece 11 connected thereto form a passage that gradually diminishes in the direction of the flow, having a center line that is at an angle α of e.g. 6° with the center line of the adapter 2 so as to ensure, even if the container is not level, that as few as possible remnants remain behind in the stop cock. Apart from that, by the conical widening of the adapter 1 and the gradual, i.e. also conical narrowing of the passage of the valve housing 1 and the outlet piece 11 it is also achieved that the passage of an open valve 3 is at least equal to the passage of the stub 2 of the liquid container.

The downstream end of the valve housing 1 has at its inner periphery a shoulder that together with the outlet piece 11 defines a groove for receiving a seat 12 that is thus positioned downstream of the shafts 6 and 7 in the direction of the liquid flow. The valve housing 1 and the adapter 2 include four flange lugs 13 in order to allow the assembly and disassembly of the valve housing 1 with the aid of four bolts 14 arranged in a square This can thus be done in four positions divided over 90°. The outlet piece 11 comprises external screw thread 15 so that a hose (not shown) can be connected thereto. Instead of screw thread 15, it is of course also possible that a bayonet fitting portion has been mounted.

Figure 6:
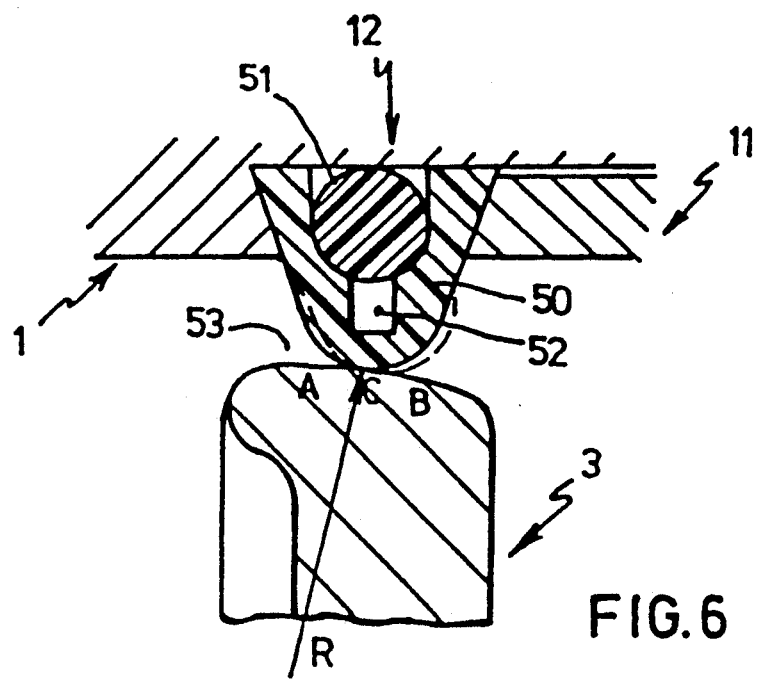
FIG. 6 shows a detailed section of the seat and the cock at a larger scale.

The seat 12 is made of teflon with along the outer periphery a groove, to be further elucidated on the basis of FIG. 6, in which groove a rubber O-ring has been placed. The shoulders of the valve housing 1 cooperating with the seat 12 and the outlet piece 11 are of course adapted to the outwardly widening cross-section of the seat 12.

The valve housing 1 and the outlet piece 11 include two flange lugs 16 so that the outlet piece 11 can be assembled and disassembled with the aid of four bolts 17 arranged in a rectangle. Two different positions are therefore possible, shifted over 180°. The seals between the adapter 2, the valve housing I and the outlet piece 11 are effected by means of gaskets 18 and 19, respectively.

On the top end of the operational shaft 7, a handle 21 is fixed with the aid of a handle pin 20. By placing a load on the handle 21, the valve 3 can be rotated so as to be placed in a fully closed position in which the valve 3 abuts the seat 12, a fully open position in which the valve is positioned in the direction of the liquid flow, an intermediate position (in which it is to be manually kept when the liquid flows through), or in a final position in which the rear of the valve can be cleaned through the outlet piece 11.

Due to the eccentric positioning of the disc valve 3, pressure differences occur on either side of the valve, which usually result in the partial closing and rattling of the valve, but on account of the design of the valve (concave rear side) the invented valve remains open of its own accord. It is also possible that the fact that the adapter 2 widens conically contributes to this phenomenon.

As the operational shaft 7 protrudes from the valve housing 1, gaskets 22, 23 are required to prevent leakages and these are housed in the upper boss 9 that thus is of greater dimensions than the lower boss 5.

The uppermost boss 9 carries a top plate 24 that comprises a passage for the operational shaft 7.

Figure 2:
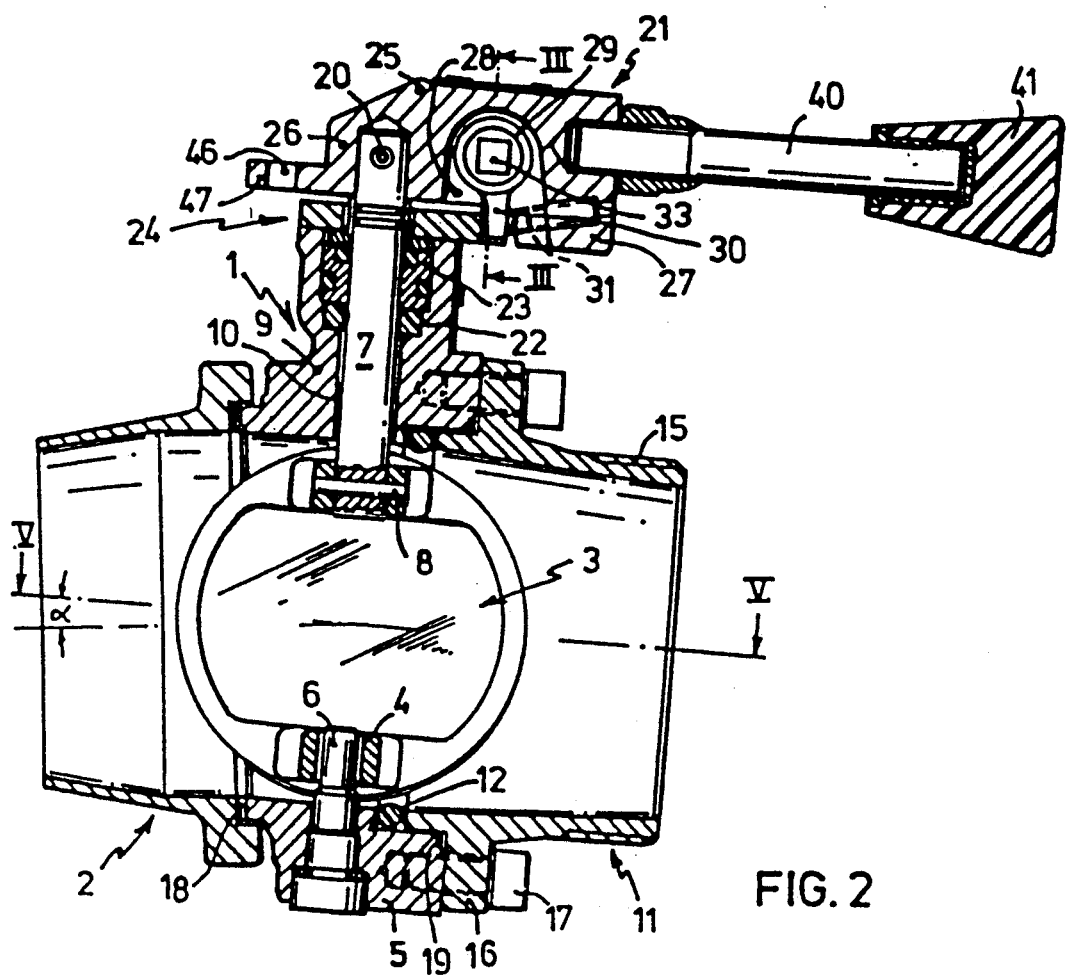
FIG. 2 shows a section of the stop cock along the line 11—11 of FIG. 1.

The handle 21 consists of a reversed U-shaped body 25 with a short and thick leg 26 with provisions for receiving and fixing the operational shaft 7 and the handle pin 20, and a longer and relatively thinner leg 27, of which the difference in length substantially corresponds to the thickness of the top plate 24. Between the legs 26 and 27 there is a recess 28 in which a stop bush 29 with downwardly directed cam 30 can rotate about a horizontal center line between a vertical position (FIG. 2) and a position rotated counter-clockwise in FIG. 2 against the pressure of a spring 31, received in a bore of the long leg on the one hand and on a projection 32 of the cam 30 on the other hand.

The stop bush 29 has a square hole 33 for receiving a driving shaft 34 that projects perpendicularly from one end of an unlocking lever 35. This unlocking lever can be inserted into the hole 33 so as to either assume the position indicated by the uninterrupted line in FIG. 1, or the position indicated by the interrupted line. It can be safeguarded against removal by a locking bolt 36, but this is somewhat contrary to the double safeguard which is sometimes required.

Figure 3:
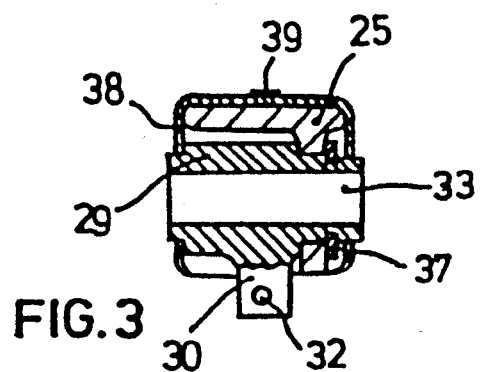
FIG. 3 shows a section of the reversed U-shaped body of the handle along the line III—III of FIG. 2.
Figure 4:
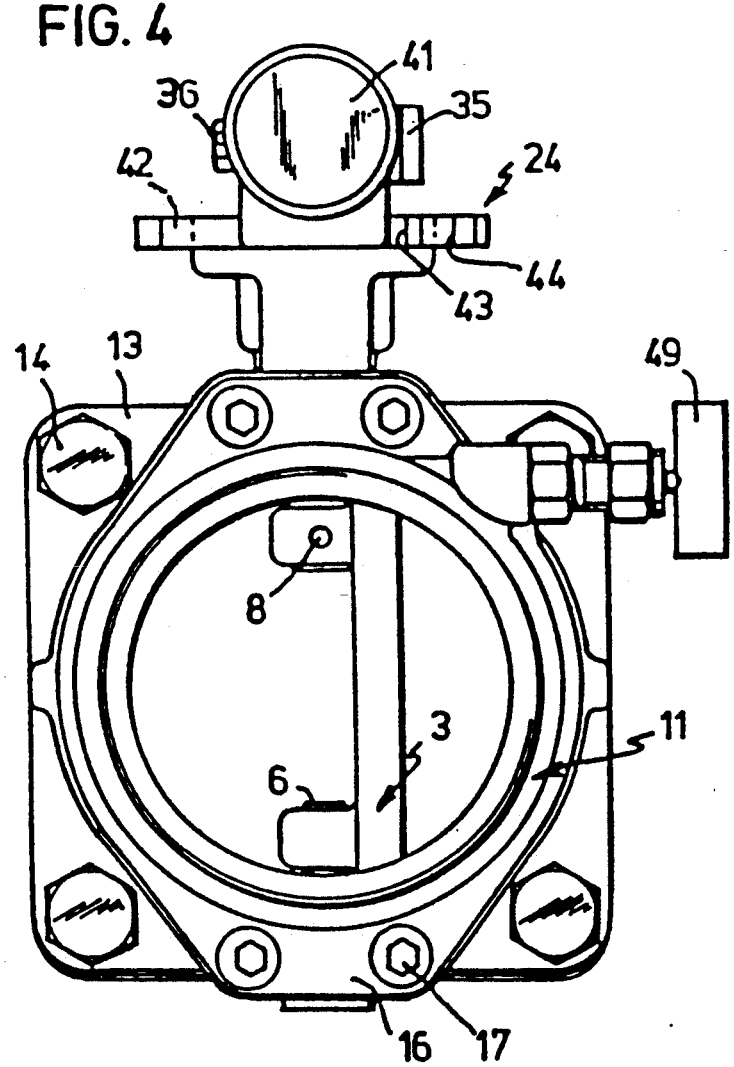
FIG. 4 shows a right-hand side view of the stop cock of FIG. 2.

In FIG. 3 it can be seen how the stop bush 29 can be mounted into the recess 28. A relatively long portion of the stop bush 29 of reduced diameter is inserted into a vertical wall of the U-shaped body 25, which wall defines the recess 28, and a clamping ring 37 is placed upon the projecting portion. Subsequently, a flexible hood 38 is clicked over the two projecting portions of reduced diameter and secured with two locking bolts 39.

It goes without saying that it is not important to the invention that the handle 21 in the shown embodiment furthermore comprises a rod 40 screwed into the thicker leg 27 and a button 41. The parts 40 and 41 could just as well have been formed integrally with the U-shaped body 25.

The outer periphery of the top plate 24, however, is important. This comprises an indentation 42 for receiving the cam 30 of the stop bush 29 when the valve is in the closed position, a cam 43 for determining the open position of the valve, from which position the valve can be rapidly closed in emergencies (possibly by foot) because no actuation of the unlocking lever 35 is required, and a cam 44 for determining the final, open position of the valve in which the rear side of the valve 3 can be cleaned. These positions have all been shown in FIG. 5. Past the indentation 42 and the cam 44, FIG. 1 furthermore shows edges that merely serve to prevent the handle 21 from being turned any further at maximum counter-clockwise rotation of the unlocking lever 35, and therefore they have not been provided with a reference numeral.

If local circumstances would render such desirable, the position of the handle 21 of FIG. 1 that corresponds with the open position of the valve can also be chosen at a position displaced over 180°. For that purpose the handle 21 and top plate 24 have to be removed, and remounted in the new positions. For that purpose the top plate 24 is secured by means of four bolts (not shown) screwed through holes 45 arranged in a rectangle to the upper boss 7. These holes 45 have been arranged in a rectangle, i.e. not in a square, so as not to break the common rule that the positions of the valve 3 and the handle 21 should correspond to one another.

By mounting the top plate 24 upside down, one can effect a counter-clockwise rotation towards the open position of the stop cock.

It is possible in all positions to safeguard the stock cock against unauthorized opening in the closed position by means of a padlock (not shown) to be applied through a security hole 46 in a triangular flange 47 protruding from the shorter leg 26, and a security hole 48 in the top plate 24. In order to provide spaces for the padlock, the upper boss 9 has a cross-section that is indicated by undulating dotted lines in FIG. 1. However, one could also state that the upper boss 9 actually has a circular outer periphery that at the end facing towards the top plate 24 comprises four flange lugs with screw holes for securing the top plate 24. It goes without saying that those security holes 46 and 48 can also be used for applying a seal. If the seal to be applied should render it necessary, the holes can also be other than round.

A tap 49 is mounted on the outlet piece 11. As remarked above, the outlet piece 11 can be placed in different positions, just like the handle 21 and the top plate 24. If the tap 49 is disposed at the upper boss 9 it is a vent cock, and in the other case it is a test cock.

By removing the outlet piece 11, the seat 12 can easily be replaced or reversed so as to be used for a second time.

In FIG. 6, the cooperation between the valve 3 and the seat 12 is further elucidated. The substantially tapered edge of the valve 3 that sealingly contacts the seat 12 extends spherically between points A and B, radius R being the distance between the rotational shaft of the valve and the points between A and B. On an unbiased seat, this radius R is somewhat larger than the tangent radius. The seat 12 consists of two parts: a ring 50 of Teflon or a similar material which widens radially and outwardly, having along its outer periphery a semi circular groove for an 0-ring of rubber or a similar material. By having the groove, which is semicircular in cross-section, transfer in the radial, inward direction into a deformation cavity 52, the seat 12 obtains a quite favorable combination of deformation and sealing properties which allow the stop cock to be operated by means of a short, i.e. space-saving, handle 21 without any detrimental effect on the closed position of the stop.

Figure 5:
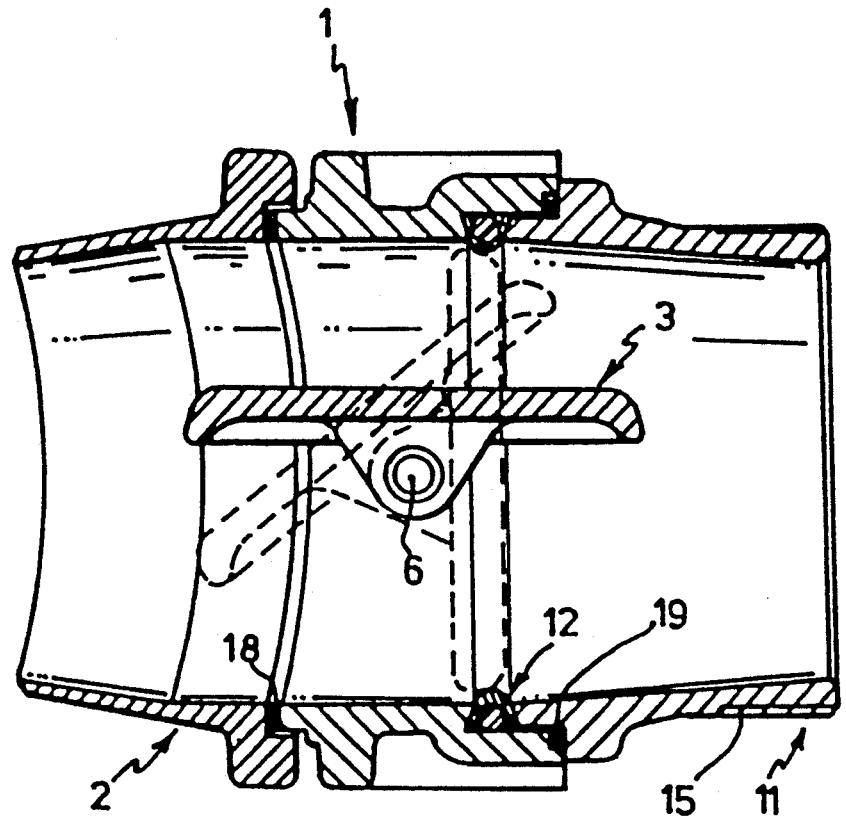
FIG. 5 shows a section of the stop cock along the line V—V of FIG. 2.

If the valve 3 is turned clockwise from the open position of the valve represented in FIG. 5 with uninterrupted lines to the closed position indicated by dotted lines, the seat 12 can be deformed in a manner represented in FIG. 6 by means of a dotted line, the seat 12 being deformed by the left-hand side of the valve over the portion A to C and by the right-hand side of the valve over the portion B to C, in which in both cases the extent of compression of these portions remains equally large; the seat being somewhat twisted, as it were. At the location of the short shaft 6 and the operational shaft 7, the valve 3 is almost always in contact with the seat, the actual place of contact being dependent on the position of the valve.

If from the open position of the stop cock shown in FIG. 5 by means of uninterrupted lines rotation is performed counter-clockwise over approx. 45°, for which action first the unlocking lever 35 has to be operated, the final position in which the rear side of the valve 3 can be cleaned is attained, as has been stated before.

The scope of the invention also covers other embodiments than the one shown in the drawing and/or discussed on the basis thereof.

What is claimed is:

1. Stop cock for a liquid container, comprising:
   a housing (1) having a longitudinal centerline;
   a valve (3) rotatably supported about an axis within said housing substantially perpendicular to said longitudinal center line;
   a seat (12) for sealing between said housing and said valve in a closed position;
   a handle (21) mounted outside said housing on an operational shaft (7) for rotating said valve between said closed position and an open position; and
   a plate (24) mounted outside said housing in a plane substantially parallel to a plane defined by the movement of said handle between said closed and open positions,
   wherein said valve is eccentrically mounted with respect to the axis about which it rotates and has first and second sides, said first side facing away from said liquid container in the closed position and said second side facing toward said liquid container in said closed position with both sides of said valve disposed on the same side of the axis about which said valve rotates and said second side further showing a cavity toward said liquid container in said closed position.

2. The stop cock of claim 1 further characterized in that the central area of the edge of said valve (3) that engages said seat (12) extends spherically along a radius (R) which is slightly bigger with respect to the rotational centerline of said valve than the tangent circle on an unbiased seat about that same rotational center line and in that said seat is received in a seat groove that is defined by said valve housing (1) and an outlet piece (11) and may be mounted in two different positions.

3. The stop cock of claim 2 further characterized in that said seat (12) comprises a plastic ring (50) growing wider in cross-section in the radial direction and having along its periphery a semi-circular groove in which a rubber O-ring (51) is disposed, and in that said seat groove defined by said valve housing (1) and said outlet piece (11) comprises bevels adapted thereto.

4. Stop cock for a liquid container, comprising:
   a housing (1) having a longitudinal centerline;
   a valve (3) rotatably supported within said housing substantially perpendicular to said longitudinal center line;
   a seat (12) for sealing between said housing and said valve in a closed position;
   a handle (21) mounted outside said housing on an operational shaft (7) for rotating said valve between said closed position and an open position; and a plate (24) mounted outside said housing in a plane substantially parallel to a plane defined by the movement of said handle between said closed and open positions, said plate and handle characterized by an indentation (42) on said plate for defining said closed position of said valve;

a cam (43) on said plate for restricting said open position of said valve;

a stop bush (29) movably mounted on said handle and including a cam follower (30) receivable in said indentation for locking said valve in said closed position; and an independently actuated unlocking lever (35) for unlocking said valve by releasing said cam follower from said indentation wherein said handle is movable from said closed to said open position only after said unlocking lever has been independently actuated to release said cam follower from said indentation while said handle is rapidly movable from said open to said closed position without independent actuation of said unlocking lever.

5. Stop cock according to claim 4, characterized in that the central area of the edge of the valve (3) that engages the seat (12) extends spherically along a radius (R) which is slightly bigger with respect to the rotational center line of the valve than the tangent circle on an unbiased seat about that same rotational center line, in that the valve (3) is rotatably supported by a short shaft (6) and the operational shaft (7) in the extension thereof, so that the valve (3) in the closed position may show a cavity directed towards the liquid container, and in that the seat (12) is received in a seat groove that is defined by the valve housing (1) and an outlet piece (11) that can be mounted in two different positions.

6. Stop cock according to claim 5, characterized in that the seat (12) comprises a plastic ring (50), growing wider in cross-section in the radial direction, and having along its periphery a semi-circular groove in which a rubber O-ring (51) is disposed, and in that the seat groove defined by the valve housing (1) and the outlet piece (11) comprises bevels adapted thereto.

7. Stop cock according to claim 5, characterized in that the semi-circular groove in the radial, inward direction passes into a deformation cavity (52).

8. Stop cock according to claim 5, characterized in that the outlet piece (11) further comprises a tap (49).

9. The stop cock of claim 4 further comprising a stop (44) on said plate (24) positioned on the opposite side of said cam (43) from said indentation (42), said stop for cooperation with said cam follower (30) for restricting further movement of said valve (3) in a position in which the rear side of said valve may be cleaned.

10. The stop cock of claim 4 wherein said stop bush (29) is rotatably mounted on said handle (21) and said cam follower (30) is biassed toward said plate (24).

11. The stop cock of claim 10 wherein said cam follower (30) is biassed by a spiral spring (31) toward the periphery of said plate (24).

12. The stop cock of claim 11 wherein said stop bush (29) is mounted in a recess (28) in said handle (21).

13. The stop cock of claim 12 wherein said plate (24) is mountable in a plurality of positions.

14. The stop cock of claim 4 wherein said indentation (42) and said cam (43) are disposed on the periphery of said plate (24) and separated by about 90 degrees.

15. The stop cock of claim 14 wherein said stop is disposed on the periphery of said plate (24) about 45 degrees from said cam (43) and about 135 degrees from said indentation (42).

16. The stop cock of claim 4 wherein said stop bush (29) comprises an unround passage (33) for receiving a correspondingly formed drive shaft (34) on said unlocking lever (35).

17. The stop cock of claim 4 further including a conically widening adapter (2) mounted on a first side of said housing (1) and having a longitudinal centerline, said adapter for connecting between said liquid container and said housing, said mounting characterized in that the longitudinal centerline of said housing is at a downward angle of about 6 degrees with respect to the longitudinal centerline of said adapter.

18. The stop cock of claim 17 further including a conically narrowing outlet piece (11) connected to said housing (1) along the longitudinal centerline of said housing and on the opposite side of said valve (3) from said adapter (2).

* * * * *